Patented Nov. 13, 1934

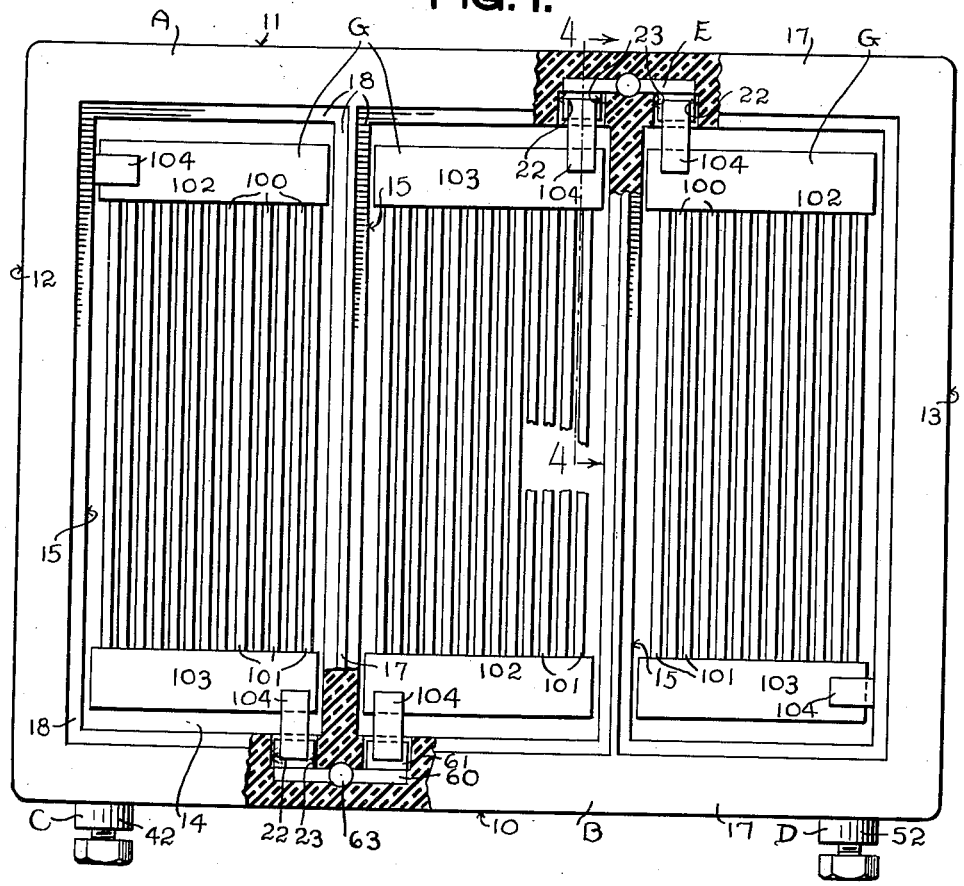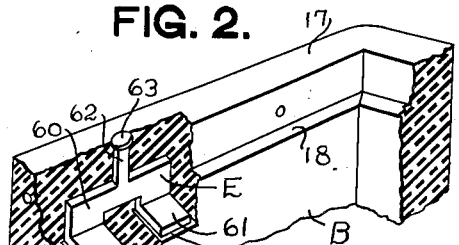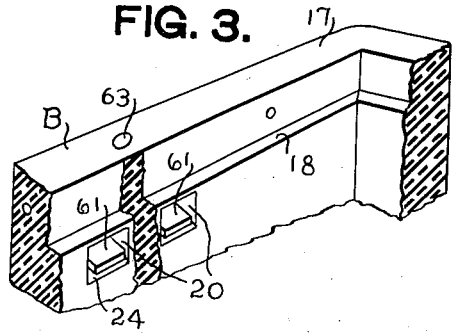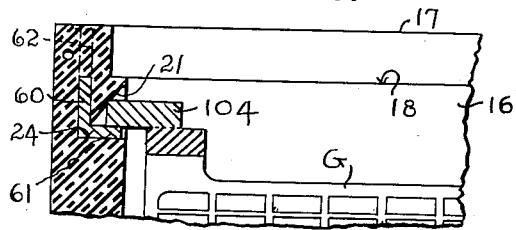

1,980,903

UNITED STATES PATENT OFFICE 1,980,903

STORAGE BATTERY ELEMENT

William G. Blake, Savannah, Ga.

Original application June 6, 1932, Serial No. 615,743. Divided and this application March 22, 1933, Serial No. 662,174

3 Claims. (Cl. 136—134)

This invention relates to storage battery receptacles and more particularly to electrical current conducting or intercell connecting elements therefor. It is a division of United States application, Serial Number 615,743, filed June 6, 1932.

The primary object of this invention is to provide, in a storage battery receptacle, elements which, in addition to their ordinary functions, will aid in protecting the plates of the battery against road shock and rough treatment of the receptacle in general.

Another object is to eliminate the conventional exposed elongate cell connectors ordinarily provided for storage batteries, and provide intercell connections built into the storage battery receptacle and not carried by the covers of the receptacle.

Another object is to provide such elements which may be easily connected to conventional grouped battery plates without altering the conventional straps forming a part of the plate assembly.

Still another object is to provide, as a part of intercell connections, novel test terminals.

Another object is to provide such connection elements for storage battery plate groups which elements are adapted to be carried by the relatively thick casing walls of the battery receptacle and not by the generally thin partition walls between the cells.

Another object is to provide such electrical current conducting elements which will not bend nor sag due to the weight of the plates nor break therefrom and cause short circuit.

Another object is to provide a novel intercell connection element which is inexpensive to manufacture, requires no stiffening to reinforce it, nor does it require bending by the user in order to adapt it for connection to the battery plates.

Other objects and advantages of the invention will be apparent during the course of the following detailed description, taken in connection with the accompanying drawing, forming a part of this specification, and in which drawing:—

Figure 1 is a top plan view of the storage battery receptacle, described in the above mentioned co-pending application, with conventional plates in place, part of the receptacle being broken away to better illustrate the novel features of the invention.

Figure 2 is a fragmentary perspective view of a corner portion of the novel storage battery receptacle with a portion of the insulating material broken away exposing the improved intercell connection.

Figure 3 is a fragmentary perspective view of the corner portion of the storage battery receptacle illustrated fragmentarily in Figure 2.

Figure 4 is a fragmentary view substantially on the line 4—4 of Figure 1.

In the drawing, wherein for the purpose of illustration is shown only a preferred embodiment of the invention, the letter A may designate the improved storage battery receptacle including a vessel B, a pair of terminal elements C and D, the novel current conducting or intercell connection elements E and conventional battery plate groups or elements G.

The improved storage battery receptacle illustrated is one adapted to house three groups of elements G but it should be understood that groups of any odd number above three may be housed as well. By the employment of the novel element E, two groups of plates G may be also electrically connected. The receptacle A illustrated is particularly adapted for use in motor vehicles and the like, but it should be understood that the receptacle has a much larger range of usage.

The vessel B is preferably elongate and includes outer walls comprising vertical side walls 10 and 11 and vertical end walls 12 and 13 of substantial thickness, and a bottom wall 14. The interior of the vessel is preferably sub-divided into a plurality of compartments 15 by spaced apart vertical partition walls 16 extending laterally of the vessel. The upper ends 17 of each wall 10, 11, 12, 13 and 16 are flush and the compartment facing surfaces of the several walls last mentioned are stepped adjacent their upper ends 17 forming a plurality of shoulders 18 for the purpose of accommodating the rims of the battery covers (not shown, but described in detail in said co-pending application). It is preferred that the several above named portions of the vessel B be integral and the vessel B is preferably of a moldable composition of electrical energy insulating material such as rubber.

Extending inwardly from the inner surface of each of the walls 10 and 11 are two recesses 20 disposed so that there is a recess to each side of and preferably close adjacent each partition wall 16. These recesses 20 are located fairly close to the upper end 17 of the vessel B as shown in Figure 4, but are slightly below the shoulders 18. Each recess is provided with a preferably beveled rear wall 21 which extends from the inner surface of the outer walls mentioned downwardly and away from the interior surface of the wall. The end walls 22 and 23 of the recess are preferably vertical and a flat horizontal ledge 24 forms the lowermost wall of each recess 20.

Preferably molded into the end and side walls of the vessel B are the terminal elements C and D, which are fully described in the co-pending application above referred to, this terminal element C being provided with a terminal post 42 and the terminal element D with a terminal post 52.

As for the novel electrical current conducting or intercell connection elements E, each of the same includes a preferably flat elongate plate member 60 of electrical current conducting material such as lead and at or adjacent each end of the plate 60 is a laterally extending lug or connector 61. Extending upwardly from substantially the lateral medial line of the plate 60 is a lead 62 ending in a preferably disc-like test terminal 63. When an element E is molded or embeded into the vessel B, each of the lugs 61 of the element E will lie flat upon a ledge 24 of a recess and will not extend beyond the ledge. Thus, while the lugs may be of soft lead, not reinforced by any embedded stiffener, they will not bend nor break since they are fully supported upon the ledges 24. If these lugs 61 do not extend into the compartment 15 of the vessel B, there are no projections which might seriously interfere with the assembly and use of the storage battery.

The elements G are conventional groups of spaced apart positive and negative plates 100 and 101, respectively, with each group suitably connected, as by burning, to conventional straps 102 and 103, respectively. Elongate leads or connector links 104 composed of electrical conducting material may be burned on the straps 102 and 103 and also burned upon the several lugs 61 as shown in Figure 1, while similar links 104 also connected to the straps 102 and 103 as by burning bridge the intervening space between the straps and the vessel where they are connected to the terminal elements C and D as fully brought out in the copending application heretofore referred to.

The plates 60 form, in effect, a reinforcement for the walls into which they are molded and as can be seen, as for example in Figure 4, the links 104 abut the beveled walls of the recesses thus aiding in preventing vibration of the plates. The test terminals 63 do not project beyond the upper surface 17 of the vessel B and are very conveniently placed for use.

It should be noted that with the construction shown, neither the conventional battery covers nor the ordinarily thin partition walls between the cells carry any part of the weight of the elements G so that either or both the covers and partition walls may be of very light construction if desired. The two point attachment of the elements G at opposite corners to the links 104 and the abutment of the links mentioned above, prevents lateral and longitudinal shifting of the elements G. The links 104 are easily manipulated to be burnt upon the lugs 61 and straps 102 and 103.

Various changes in details may be made to the form of invention herein shown and described, without departing from the spirit of the invention or the scope of the claims.

What is claimed is:

1. In a storage battery receptacle, a vessel of electrical energy insulating material provided with a partition wall, whereby a pair of cells are provided, each cell being adapted to house a pair of elements, each element comprising a group of positive and negative plates, said vessel also provided with a pair of spaced apart recesses in an outer wall thereof, one recess opening into the interior of said vessel to each side of said partition wall, said recesses having horizontal ledges and having sloping rear walls extending downwardly and away from the interior of said vessel, and an electrical current conducting element moulded into said vessel adjacent said recesses, said element provided with a pair of horizontally extending lugs resting upon said ledges, said lugs spaced from said sloping rear walls and extended to each side of said partition wall.

2. In a storage battery receptacle, a vessel of electrical energy insulating material having a partition wall and an electrical current conducting element embedded within an exterior vertical wall of said vessel, said exterior wall having an upper face, and said element lying wholly within the planes of the surfaces of said exterior wall, said element comprising an elongated, substantially L-shaped plate member including a pair of laterally extending lugs projecting towards the interior of said vessel, with their free ends exposed to the interior of said vessel, one to each side of said partition wall, and also having an upwardly extending lead projecting to the upper surface of said wall into which said element is embedded and with the free end of said lead enlarged and exposed at the upper face of said exterior wall, whereby a test terminal is provided.

3. In a storage battery receptacle, a vessel of electrical energy insulating material having outer walls and a partition wall, whereby a pair of cells are provided, each cell being adapted to house a group of positive and negative plates, said vessel provided with a pair of spaced apart recesses in an outer wall thereof, one of said recesses being disposed to each side of said partition wall and opening into the interior of said vessel, and said recesses providing horizontal ledges and having sloping rear walls extending downwardly and away from the interior of said vessel, and an electrical current conducting element carried wholly within the planes of the surfaces of said outer wall of the vessel and adjacent said recesses, said electrical current conducting element including an elongated plate member provided with a pair of laterally extending lugs resting upon said ledges to each side of said partition wall and spaced from the sloping rear walls of said recesses.

WILLIAM G. BLAKE.